United States Patent
Naito et al.

(10) Patent No.: US 10,591,905 B2
(45) Date of Patent: *Mar. 17, 2020

(54) WORK REGION ESTIMATION DEVICE, CONTROL DEVICE, CONTROL SYSTEM, WORK REGION ESTIMATION METHOD, AND NON-TRANSITORY COMPUTER-READABLE RECORDING MEDIUM

(71) Applicant: OMRON Corporation, Kyoto (JP)

(72) Inventors: Sayaka Naito, Joyo (JP); Yoshikazu Mori, Koriyama (JP); Kazuki Kasai, Setagaya (JP); Osamu Nishizaki, Nara (JP)

(73) Assignee: OMRON Corporation, Kyoto (JP)

( * ) Notice: Subject to any disclaimer, the term of this patent is extended or adjusted under 35 U.S.C. 154(b) by 26 days.

This patent is subject to a terminal disclaimer.

(21) Appl. No.: 15/751,160

(22) PCT Filed: Jan. 10, 2017

(86) PCT No.: PCT/JP2017/000386
§ 371 (c)(1),
(2) Date: Feb. 7, 2018

(87) PCT Pub. No.: WO2017/141567
PCT Pub. Date: Aug. 24, 2017

(65) Prior Publication Data
US 2018/0231961 A1    Aug. 16, 2018

(30) Foreign Application Priority Data
Feb. 15, 2016 (JP) .................................. 2016-025959

(51) Int. Cl.
*G05B 19/00* (2006.01)
*G06Q 50/00* (2012.01)
(Continued)

(52) U.S. Cl.
CPC ...... *G05B 19/41865* (2013.01); *B25J 9/1676* (2013.01); *B62D 65/18* (2013.01);
(Continued)

(58) Field of Classification Search
None
See application file for complete search history.

(56) References Cited

U.S. PATENT DOCUMENTS 6,205,367 B1   3/2001  Arita et al.
7,747,957 B2 * 6/2010  Masuda ................ G06Q 10/10
                                                709/204

(Continued)

FOREIGN PATENT DOCUMENTS

CN   101913076   12/2010
CN   103538647   1/2014

(Continued)

OTHER PUBLICATIONS

"International Search Report (Form PCT/ISA/210) of PCT/JP2017/000386", dated Apr. 18, 2017, with English translation thereof, pp. 1-3.

(Continued)

*Primary Examiner* — Ronald D Hartman, Jr.
(74) *Attorney, Agent, or Firm* — JCIPRNET (57) ABSTRACT

This work region estimation device, which estimates a region in which a worker performs work, is provided with: a first operation acquisition unit that acquires worker operation information; an orientation acquisition unit that acquires worker orientation information; and a work region calculation unit that, on the basis of the operation information, the orientation information, and a worker body model, calculates a region in which a worker operation is forecast.

17 Claims, 3 Drawing Sheets

(51) Int. Cl.
*G05B 19/418* (2006.01)
*G06Q 50/04* (2012.01)
*B25J 9/16* (2006.01)
*B62D 65/18* (2006.01)
*G06Q 10/06* (2012.01)

(52) U.S. Cl.
CPC ....... *G06Q 10/06311* (2013.01); *G06Q 50/04* (2013.01); *G05B 2219/40202* (2013.01)

(56) References Cited

U.S. PATENT DOCUMENTS

| | | | | |
|---|---|---|---|---|
| 2008/0161970 | A1* | 7/2008 | Adachi | B25J 9/0003 700/253 |
| 2010/0114373 | A1* | 5/2010 | Hale | B25J 19/06 700/258 |
| 2011/0050878 | A1* | 3/2011 | Wells | H04N 7/181 348/86 |
| 2012/0182155 | A1* | 7/2012 | Sato | B25J 9/1674 340/686.6 |
| 2012/0279285 | A1* | 11/2012 | Kato | B21D 5/02 73/65.01 |
| 2012/0290132 | A1* | 11/2012 | Kokubo | B25J 9/1666 700/255 |
| 2013/0088593 | A1* | 4/2013 | Ishimoto | E02F 9/226 348/143 |
| 2014/0163424 | A1* | 6/2014 | Kawaguchi | A61B 5/0077 600/595 |
| 2014/0303767 | A1* | 10/2014 | Klumpp | G05B 19/41845 700/105 |
| 2015/0081245 | A1 | 3/2015 | Nagasaka | |
| 2015/0228078 | A1* | 8/2015 | Zahand | G06K 9/00771 382/103 |
| 2015/0293525 | A1* | 10/2015 | Yamamoto | G06T 19/20 702/182 |
| 2015/0352719 | A1* | 12/2015 | Nakazato | B25J 9/1674 700/253 |
| 2016/0069585 | A1* | 3/2016 | Shrubsole | H04L 12/282 700/276 |
| 2016/0195867 | A1* | 7/2016 | Lamers | G05B 19/402 700/100 |

FOREIGN PATENT DOCUMENTS

| | | |
|---|---|---|
| JP | H10-240791 | 9/1998 |
| JP | 2004-230541 | 8/2004 |
| JP | 2006-43862 | 2/2006 |
| JP | 2015-58167 | 3/2015 |

OTHER PUBLICATIONS

"Written Opinion of The International Searching Authority (Form PCT/ISA/237)" of PCT/JP2017/000386, dated Apr. 18, 2017, with English translation thereof, pp. 1-10.

J.A.Corrales, et al., "Cooperative Tasks between Humans and Robots in Industrial Environments", International Journal of Advanced Robotic Systems, vol.9, No. 3, Jan. 1, 2012, pp. 1-10.

"Office Action of China Counterpart Application," with English translation thereof, dated Sep. 29, 2019, p. 1- p. 26.

"Search Report of Europe Counterpart Application", dated Oct. 7, 2019, p. 1-p. 11.

* cited by examiner

WORK REGION ESTIMATION DEVICE, CONTROL DEVICE, CONTROL SYSTEM, WORK REGION ESTIMATION METHOD, AND NON-TRANSITORY COMPUTER-READABLE RECORDING MEDIUM

CROSS-REFERENCE TO RELATED APPLICATION

This application is a 371 of international application of PCT application serial no. PCT/JP2017/000386, filed on Jan. 10, 2017, which claims the priority benefit of Japan application no. 2016-025959, filed on Feb. 15, 2016. The entirety of each of the abovementioned patent applications is hereby incorporated by reference herein and made a part of this specification.

TECHNICAL FIELD

The present invention relates to a work region estimation device, a control device, a control system, a work region estimation method, and a program.

BACKGROUND ART

Conventionally, a production line of a factory is known (for example, refer to Patent Literature 1).

The production line in Patent Literature 1 is used in a vehicle assembling process or the like and includes a vehicle conveyor which conveys a vehicle, a worker conveyor which moves a worker in a conveyance orientation of the vehicle, a controller which controls the worker conveyor, and a sensor worn by the worker. The sensor has a function of detecting an orientation of the worker and a movement acceleration of the worker. Additionally, the controller is configured to control an operation orientation and an operation speed of the worker conveyor in accordance with the orientation and the movement acceleration of the worker. Therefore, since the worker is hardly forced to move by walking, walking fatigue of the worker can be reduced.

CITATION LIST

Patent Literature

[Patent Literature 1]
Japanese Unexamined Patent Application Publication No. 2004-230541

SUMMARY OF INVENTION

Technical Problem

Here, in the production line of the factory, under a circumstance in which industrial machinery and workers perform work, it is preferable to estimate a region in which the worker performs work. For example, if the region in which the worker performs work can be estimated, it is possible to widen a working region of the industrial machinery while suppressing a situation in which the worker is hindered (an operation of the industrial machinery interferes with an operation of the worker), and thus it is possible to improve productivity while securing safety.

The present invention has been made to solve the above-described problems, and an object of the present invention is to provide a work region estimation device, a control device, a control system, a work region estimation method, and a program which are capable of estimating a region in which a worker performs work.

Solution to Problem

A work region estimation device according to the present invention estimates a region in which a worker performs work, and the work region estimation device includes a first operation acquisition unit configured to acquire operation information of the worker, an orientation acquisition unit configured to acquire orientation information of the worker, and a work region calculation unit configured to calculate a region in which a worker operation is forecast on the basis of the operation information, the orientation information and a human body model of the worker.

Due to such a configuration, the region in which the worker performs the work can be estimated with high accuracy by estimating the region in which the worker operation is forecast on the basis of the orientation information which is information reflecting an intention of the worker.

In the work region estimation device, a movable range calculation unit configured to calculate a movable range of the worker on the basis of the orientation information and the human body model may be included, and the work region calculation unit may calculate a region in which a worker operation is forecast on the basis of the operation information and the movable range.

In the work region estimation device, the orientation information may include orientation information of a body of the worker and orientation information of a head of the worker, and the work region calculation unit may be configured to perform a weighted evaluation for operability in the region in which the worker operation is forecast on the basis of the orientation information of the body and the orientation information of the head.

In the work region estimation device, a state acquisition unit configured to acquire at least one of position information or posture information of the worker may be included.

In the work region estimation device having the state acquisition unit, the state acquisition unit may be configured to acquire at least one of acceleration data, angular velocity data, speed data, angular acceleration data, pressure data, and magnetic data, and calculate at least one of the position information and the posture information using the acquired data.

In the work region estimation device having the state acquisition unit, the orientation acquisition unit may be configured to calculate the orientation information on the basis of the human body model and at least one of the position information and the posture information.

In the work region estimation device having the state acquisition unit, the first operation acquisition unit may be configured to calculate the operation information on the basis of the human body model and at least one of the position information and the posture information.

In the work region estimation device having the state acquisition unit, a human body model calculation unit configured to calculate the human body model from at least one of the position information and the posture information may be included.

In the work region estimation device, a human body model recording unit configured to record the human body model may be included.

A control device according to the present invention includes the work region estimation device, and a control unit configured to control a control target.

In the control device, the control unit may be configured to operate the control target outside the region in which the worker operation is forecast.

In the control device, the orientation information may include the orientation information of the body of the worker and the orientation information of the head of the worker, the work region calculation unit may be configured to perform a weighted evaluation for operability in the region in which the worker operation is forecast on the basis of the orientation information of the body and the orientation information of the head, and the control unit may be configured to operate the control target outside a region in which the operability is equal to or greater than a predetermined value. Further, the predetermined value is, for example, a preset value and is a boundary value in which it is determined that the operability is high.

In the control device, a safety determination unit configured to determine safety when the control target enters an inside of the region in which the worker operation is forecast may be included.

In the control device having the safety determination unit, the control unit may be configured to be capable of operating the control target inside the region in which the worker operation is forecast when it is determined by the safety determination unit that it is safe.

In the control device having the safety determination unit, the control unit may be configured to set the control target to be in a state in which safety can be ensured when it is determined by the safety determination unit that it is not safe, so as to allow an operation of the control target inside the region in which the worker operation is forecast.

In the control device having the safety determination unit, the safety determination unit may be configured to determine the safety on the basis of the operation information.

In the control device having the safety determination unit, a second operation acquisition unit configured to acquire operation information of the control target may be included, and the safety determination unit may be configured to determine the safety on the basis of the operation information of the control target.

A control system according to the present invention includes the control device, and a detection device worn by a worker.

In the control system, the detection device may be configured to detect at least one of acceleration data, angular velocity data, speed data, angular acceleration data, pressure data, and magnetic data, the work region estimation device may include a state acquisition unit configured to acquire at least one of position information and posture information of the worker, and the state acquisition unit may be configured to acquire a detection result of the detection device, and calculate at least one of the position information and the posture information using the acquired detection result.

A work region estimation method according to the present invention is a method of estimating a region in which a worker performs work, and the work region estimation method includes a step of acquiring operation information of the worker, a step of acquiring orientation information of the worker, and a step of calculating a region in which a worker operation is forecast on the basis of the operation information, the orientation information and a human body model of the worker.

A program according to the present invention is for causing a computer to execute the work region estimation method.

Advantageous Effects of Invention

According to the work region estimation device, the control device, the control system, the work region estimation method, and the program of the present invention, it is possible to estimate a region in which a worker performs work.

DESCRIPTION OF EMBODIMENTS

Hereinafter, an embodiment of the present invention will be described with reference to the drawings.

First, with reference to FIG. 1 and FIG. 2, a configuration of a control system 100 according to an embodiment of the present invention will be described.

Figure 1:
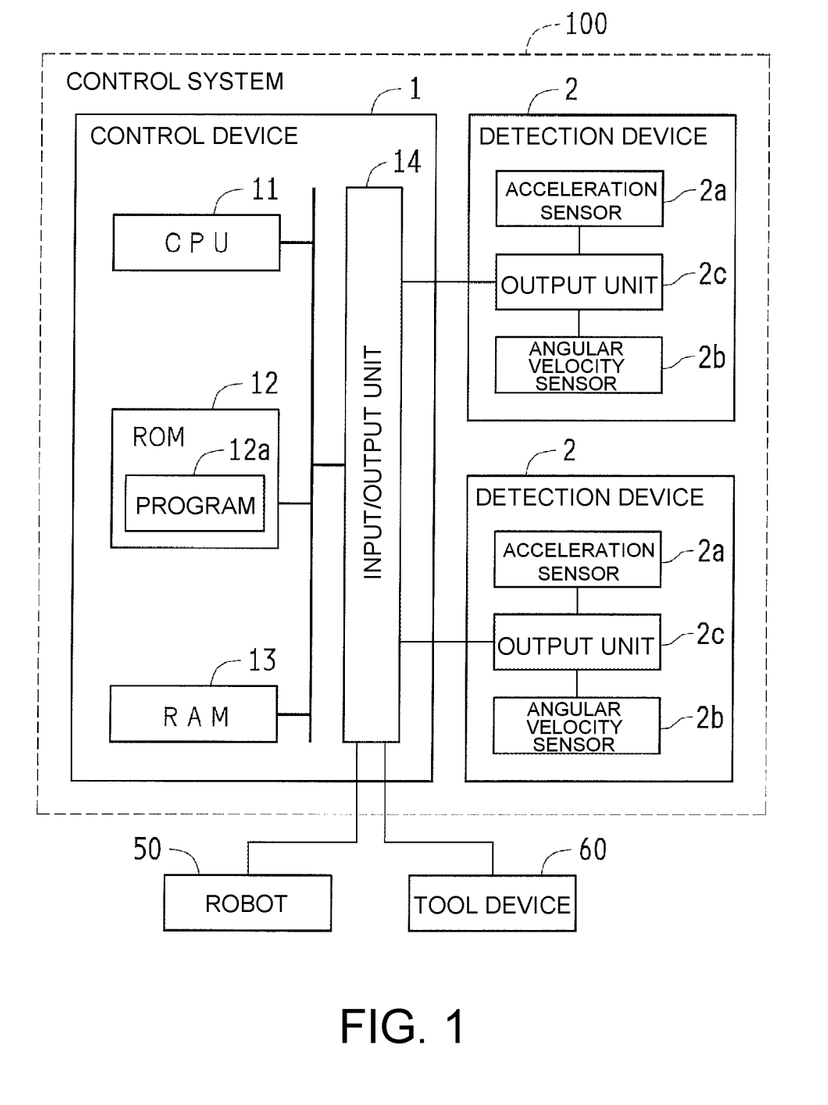
FIG. 1 is a hardware block diagram illustrating a configuration of a control system according to an embodiment of the present invention.

As illustrated in FIG. 1, the control system 100 includes a control device 1 which controls a robot 50, and detection devices 2 which are worn by a worker. The control system 100 is configured to estimate, for example, a work region (region in which a worker operation is forecast) of a worker in a production line of a factory or the like and to control the robot 50 according to the work region of the worker. Further, the robot 50 is, for example, a robot arm installed in a production line of a factory or the like and is an example of an "control target" of the present invention.

The detection devices 2 are mounted on different parts of the worker, and each of the detection devices 2 is provided to detect an operation with respect to the part on which it is mounted. Further, in FIG. 1, two detection devices 2 are illustrated, but a large number of detection devices 2 may be provided to detect operations of the whole body of the worker. As an example of mounting positions of the detection devices 2 on the worker, there are a head portion, both shoulder portions, both arm portions (upper arm, forearm, hand), a back portion, a waist portion, and both leg portions (thigh, shin, foot).

The detection devices 2 each include an acceleration sensor 2a which detects acceleration data, an angular velocity sensor 2b which detects angular velocity data, and an output unit 2c which outputs detection results of the acceleration sensor 2a and the angular velocity sensor 2b to the control device 1. Further, the detection devices 2 are connected to the control device 1, for example, wirelessly, but they may be connected to the control device 1 by wire.

The control device 1 is configured to acquire orientation information and operation information of the worker, and estimate the work region of the worker on the basis of the orientation information, the operation information and a human body model, Additionally, the control device 1 is configured to operate the robot 50 outside the work region of the worker. Also, the control device 1 determines safety when the robot 50 enters the work region of the worker and allows the robot 50 to enter the work region when it is safe.

Furthermore, the human body model of the worker is, for example, a database of a dimension of each part of the worker's body.

The control device 1 includes a CPU 11, a ROM 12, a RAM 13, and an input/output unit 14. The CPU 11 is configured to perform arithmetic processing on the basis of a program 12a or the like stored in the ROM 12. The ROM 12 is a nonvolatile memory and stores the program 12a or a setting value used when the program 12a is executed. Also, the program 12a includes a control program of the robot 50 and so on. The RAM 13 is a volatile memory and has a function of temporarily storing a calculation result by the CPU 11, a detection result of the detection devices 2, or the like. The plurality of detection devices 2, the robot 50, a tool device 60 for changing settings of the control device 1, and so on are connected to the input/output unit 14.

Figure 2:
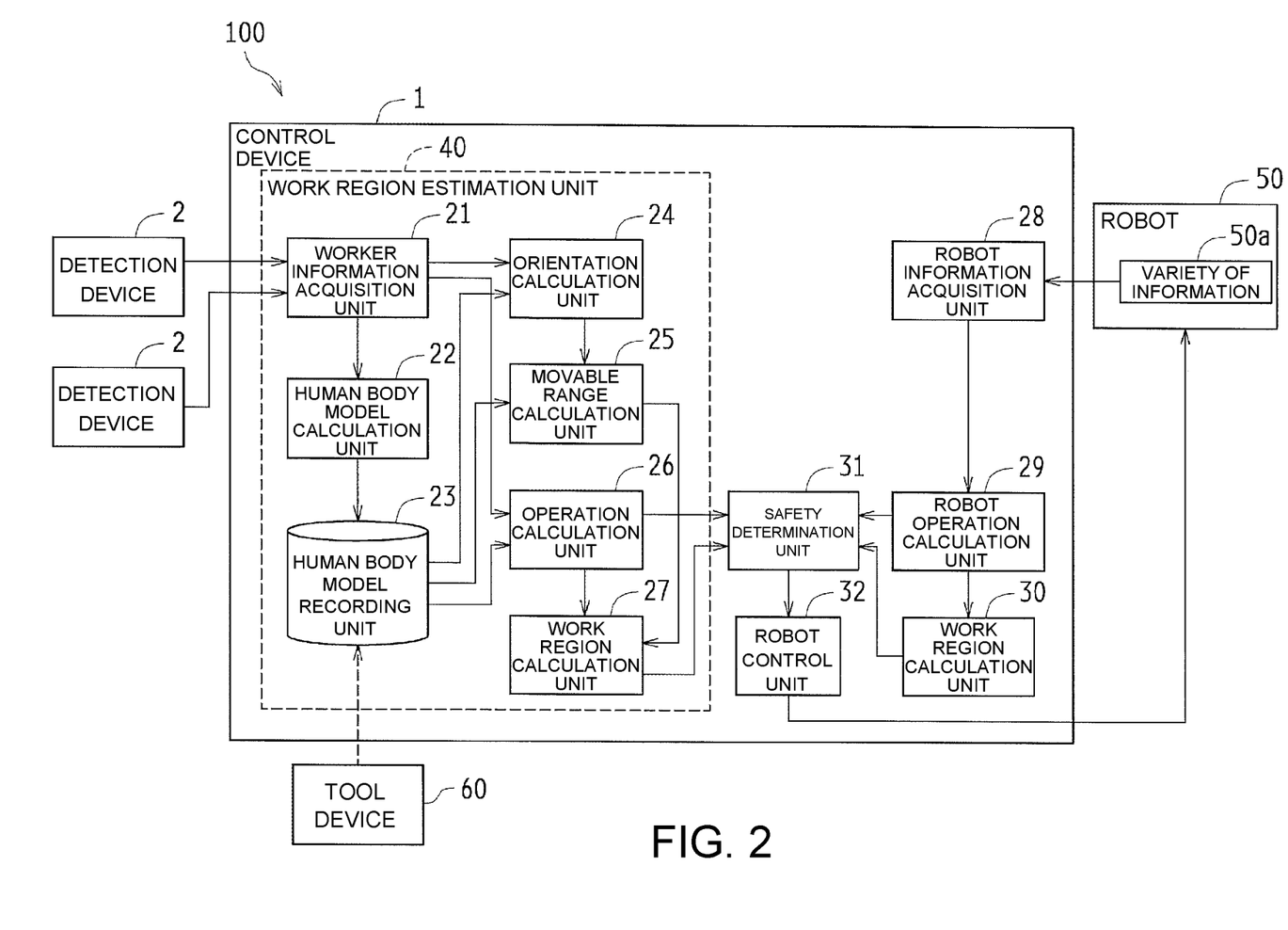
FIG. 2 is a functional block diagram of a control device in the control system of FIG. 1.

Further, as illustrated in FIG. 2, the control device 1 includes a worker information acquisition unit 21, a human body model calculation unit 22, a human body model recording unit 23, an orientation calculation unit 24, a movable range calculation unit 25, an operation calculation unit 26, a work region calculation unit 27 for a worker, a robot information acquisition unit 28, a robot operation calculation unit 29, a work region calculation unit 30 for a robot 50, a safety determination unit 31, and a robot control unit 32. Further, the worker information acquisition unit 21, the human body model calculation unit 22, the orientation calculation unit 24, the movable range calculation unit 25, the operation calculation unit 26, the work region calculation unit 27, the robot information acquisition unit 28, the robot operation calculation unit 29, the work region calculation unit 30, the safety determination unit 31, and the robot control unit 32 are realized by executing the program 12a in the CPU 11. In addition, the human body model recording unit 23 is configured with a part of a storage area of the ROM 12.

Further, a work region estimation unit 40 which estimates the work region of the worker is configured with the worker information acquisition unit 21, the human body model calculation unit 22, the human body model recording unit 23, the orientation calculation unit 24, the movable range calculation unit 25, the operation calculation unit 26, and the work region calculation unit 27. Furthermore, the work region estimation unit 40 is an example of a "work region estimation device" of the present invention.

The worker information acquisition unit 21 is configured to receive the detection result of each of the detection devices 2. That is, the worker information acquisition unit 21 acquires the acceleration data and the angular velocity data of each part of the worker over time. Additionally, the worker information acquisition unit 21 is configured to calculate position information and posture information using the acceleration data and the angular velocity data. That is, the worker information acquisition unit 21 acquires the position information and the posture information for each part of the worker over time. Further, the position information is, for example, coordinate values of three-dimensional coordinates, and the posture information is, for example, a rotation angle with respect to each coordinate axis. In addition, the worker information acquisition unit 21 is an example of a "state acquisition unit" of the present invention.

The human body model calculation unit 22 is provided to calculate a human body model of the worker on the basis of the position information and the posture information acquired by the worker information acquisition unit 21. The human body model calculation unit 22 is configured to create a human body model by calculating the dimension of each part from the temporal change of the position information and posture information of each part of the worker. Further, when the human body model is calculated by the human body model calculation unit 22, the worker may be required to perform a predetermined operation.

The human body model of the worker is recorded in the human body model recording unit 23. The human body model which is a calculation result of the human body model calculation unit 22 may be recorded in the human body model recording unit 23, and the human body model input by the worker using the tool device 60 may be recorded therein. That is, in the embodiment, there are two recording methods of the human body model for the human body model recording unit 23, and any of these methods may be used.

The orientation calculation unit 24 is provided to calculate orientation information of the worker on the basis of the position information and posture information acquired by the worker information acquisition unit 21 and the human body model recorded in the human body model recording unit 23. The orientation information includes, for example, orientation information of the body of the worker and orientation information of the head of the worker. Further, the orientation of the body is, for example, a direction in which a front side of the body faces, and it is possible to trace a change in the direction from the temporal change in the position and the posture. Similarly, the direction of the head is, for example, a direction in which the front of the head faces, and it is possible to trace the change in the direction from the temporal change in the position and the posture. Also, the orientation calculation unit 24 is an example of a "orientation acquisition unit" of the present invention.

The movable range calculation unit 25 is provided to calculate a movable range of the worker. The movable range calculation unit 25 is configured to calculate the movable range of the worker on the basis of the orientation information of the worker calculated by the orientation calculation unit 24 and the human body model recorded in the human body model recording unit 23. Also, the movable range is a predetermined region surrounding the worker and is also a region in which the worker can move his/her own body from a present state. For example, when the shoulder portion is fixed, the movable range of the arm portion is a range in which the arm portion can reach when extended.

The operation calculation unit 26 is provided to calculate operation information of the worker. The operation calculation unit 26 is configured to input the position information and the posture information acquired by the worker information acquisition unit 21 with respect to the human body model recorded in the human body model recording unit 23, thereby obtaining the operation information of each part of the worker. That is, the operation of each part is calculated from the temporal change in the position and posture of each part of the worker. Further, the operation calculation unit 26 is an example of a "first operation acquisition unit" of the present invention.

The work region calculation unit 27 is provided to calculate the work region of the worker. Specifically, the work region calculation unit 27 is configured to calculate the work region on the basis of the movable range calculated by the movable range calculation unit 25 and the operation information calculated by the operation calculation unit 26.

A variety of information 50a is input from the robot 50 to the robot information acquisition unit 28. The variety of information 50a is, for example, position information, speed information, acceleration information and route information of the robot 50 and is detected by a sensor (not shown) provided in the robot 50.

The robot operation calculation unit 29 is provided to calculate the operation information of the robot 50. The robot operation calculation unit 29 is configured to calculate the operation information of the robot 50 on the basis of, for example, the variety of information 50a acquired by the robot information acquisition unit 28 and a control program for controlling the robot 50. Further, the robot operation calculation unit 29 is an example of a "second operation acquisition unit" of the present invention.

The work region calculation unit 30 is provided to calculate the work region (region in which the worker operation is forecast) of the robot 50. The work region calculation unit 30 is configured to calculate the work region of the robot 50 on the basis of, for example, the calculation result of the robot operation calculation unit 29.

The safety determination unit 31 is provided to determine safety when the robot 50 enters the work region of the worker. The safety determination unit 31 is configured to determine whether or not the work region of the worker and the work region of the robot 50 interfere (overlap each other), and determine the safety when it is determined that the work region of the worker interferes with the work region of the robot 50.

Specifically, the safety determination unit 31 is configured to determine whether or not the worker collides with the robot 50 on the basis of the operation information of the worker and the operation information of the robot 50 when it is determined that the work region of the worker interferes with the work region of the robot 50. Further, the safety determination unit 31 is configured to calculate an impact force at the time of collision when it is determined that the worker and the robot 50 collide with each other. Furthermore, the impact force is calculated on the basis of, for example, the operation information of the worker and the operation information of the robot 50. That is, the safety is determined on the basis of the operation information of the worker and the operation information of the robot 50. Additionally, the safety determination unit 31 is configured to determine that it is safe when it is determined that the worker does not collide with the robot 50 and when the impact force is less than a predetermined value, and determine that it is not safe when the impact force is equal to or greater than the predetermined value. In addition, the predetermined value is, for example, a preset value and may be a value at which the worker does not feel pain or may be a value at which the worker is not injured.

The robot control unit 32 is provided to output an operation instruction to the robot 50. The robot control unit 32 is configured to operate the robot 50 outside the work region of the worker. Further, when the safety determination unit 31 determines that it is safe, the robot control unit 32 may operate the robot 50 inside the work region of the worker. For example, the robot control unit 32 is configured to operate the robot 50 on the basis of the control program when the work region of the worker does not interfere with the work region of the robot 50 and when the safety determination unit 31 determines that it is safe and also to stop the robot 50 such that the robot 50 does not enter the work region of the worker when the safety determination unit 31 determines that it is not safe. Further, the robot control unit 32 is an example of a "control unit" of the present invention.

—Operation of Control System—

Next, the operation of the control system 100 of the embodiment will be described with reference to FIG. 3. This operation includes a work region estimation method by the control device 1.

Further, the following steps are performed by the CPU 11 (refer to FIG. 1) executing the program 12a (refer to FIG. 1). That is, the program 12a serves to cause the control device 1 (refer to FIG. 1) to perform the following steps and is stored in the ROM 12 (refer to FIG. 1) which is a recording medium readable by the control device 1.

Further, the human body model of the worker is recorded in advance in the human body model recording unit 23 (refer to FIG. 2). This human body model may be recorded by the human body model calculation unit 22 (refer to FIG. 2) or may be recorded using the tool device 60 (refer to FIG. 2). In addition, the detection devices 2 are mounted on different parts of the worker.

Figure 3:
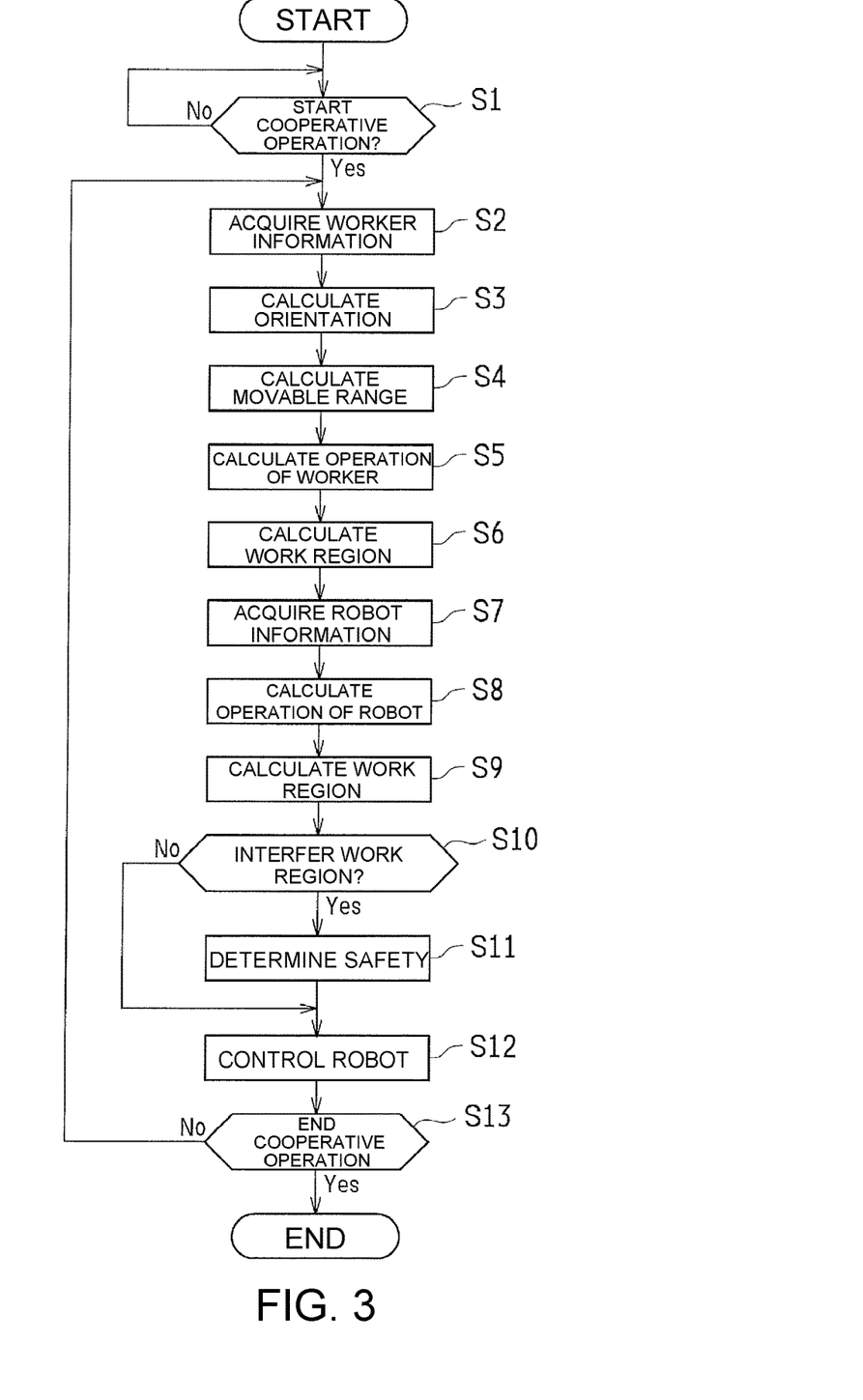
FIG. 3 is a flowchart illustrating an operation of the control system of the embodiment.

First, in Step S1 of FIG. 3, it is determined whether or not a cooperative operation between the worker and the robot 50 (refer to FIG. 2) has started. For example, when the worker operates a start button (not shown), it is determined that the cooperative operation has started. Additionally, when it is determined that the cooperative operation has started, the process proceeds to Step S2. On the other hand, when it is determined that the cooperative operation has not started, Step S1 is repeated. That is, the control device 1 waits until the cooperative operation starts.

Next, in Step S2, the position information and the posture information for each part of the worker are acquired by the worker information acquisition unit 21 (refer to FIG. 2). Specifically, the position information and the posture information of each part of the worker are calculated on the basis of the acceleration data and the angular velocity data input from each of the detection devices 2.

Next, in Step S3, the orientation information of the worker is calculated by the orientation calculation unit 24 (refer to FIG. 2). Specifically, the orientation information of the body and the head of the worker is calculated on the basis of the position information and the posture information of the worker and the human body model recorded in the human body model recording unit 23.

Next, in Step S4, the movable range of the worker is calculated by the movable range calculation unit 25 (refer to FIG. 2). Specifically, the movable range of the worker is calculated on the basis of the orientation information and the human body model of the worker.

Next, in Step S5, the operation information of each part of the worker is calculated by the operation calculation unit 26 (refer to FIG. 2). Specifically, the operation information of each part of the worker is calculated by inputting the position information and the posture information of each part with respect to the human body model recorded in the human body model recording unit 23.

Next, in Step S6, the work region of the worker is calculated by the work region calculation unit 27 (refer to FIG. 2). Specifically, the work region is calculated on the basis of the movable range of the worker and the operation information.

Next, in Step S7, the variety of information 50a (refer to FIG. 2) of the robot 50 is acquired by the robot information acquisition unit 28 (refer to FIG. 2). Also, in Step S8, the operation information of the robot 50 is calculated by the robot operation calculation unit 29 (refer to FIG. 2). Then, in Step S9, the work region of the robot 50 is calculated by the work region calculation unit 30 (refer to FIG. 2).

Next, in Step S10, the safety determination unit 31 (refer to FIG. 2) determines whether or not the work region of the worker interferes with the work region of the robot 50. This determination is made on the basis of the work region of the worker calculated in Step S6 and the work region of the robot 50 calculated in Step S9. Additionally, when it is determined that the work region of the worker interferes with the work region of the robot 50, the process proceeds to Step S11. On the other hand, when it is determined that the work region of the worker does not interfere with the work region of the robot 50, the process proceeds to Step S12.

Additionally, in Step S11, the safety is determined by the safety determination unit 31. Specifically, whether or not the worker collides with the robot 50 is determined on the basis of the operation information of the worker calculated in Step S5 and the operation information of the robot 50 calculated in Step S8. Further, when it is determined that the worker collides with the robot 50, the impact force at the time of the collision is calculated on the basis of the operation information of the worker and the operation information of the robot 50. Additionally, the safety determination unit 31 determines that it is safe when it is determined that the worker does not collide with the robot 50 and when the impact force is less than a predetermined value and determines that it is not safe when the impact force is equal to or greater than the predetermined value.

Next, in Step S12, the robot 50 is controlled by the robot control unit 32 (refer to FIG. 2). Specifically, when it is determined that the work region of the worker does not interfere with the work region of the robot 50 and when it is determined that it is safe, the robot 50 is operated on the basis of the control program. That is, when it is safe, the robot 50 is operated inside the work region of the worker. Also, when it is not safe, for example, the robot 50 is stopped not to enter the work region of the worker.

Next, in Step S13, it is determined whether or not the cooperative operation between the worker and the robot 50 has ended. For example, when the worker operates an end button (not shown), it is determined that the cooperative operation has ended. Also, when it is determined that the cooperative operation has ended, the process proceeds to the end. On the other hand, when it is determined that the cooperative operation has not ended, the process returns to Step S2.

—Effect—

In the embodiment, as described above, the orientation calculation unit 24 which calculates the orientation information of the worker, the movable range calculation unit 25 which calculates the movable range of the worker on the basis of the orientation information and the human body model, the operation calculation unit 26 which calculates the operation information of the worker, and the work region calculation unit 27 which calculates the work region of the worker on the basis of the movable range and the operation information are provided. Due to such a configuration, the work region of the worker can be estimated with high accuracy by estimating the work region on the basis of the orientation information which is information on which an intention of the worker is reflected. Further, the estimation accuracy of the work region can be further improved by considering the operation information of the worker. That is, it is possible to estimate the work region narrowed down from the movable range using the operation information.

Further, in the embodiment, the robot control unit 32 which operates the robot 50 outside the work region of the worker is provided. Due to such a configuration, it is possible to prevent the robot 50 from colliding with the worker in a situation in which the robot 50 and the worker cooperatively perform work, and thus it is possible to improve the safety. Furthermore, since the robot 50 can approach the limit to the worker, it is possible to widen the work region of the robot 50, and thus productivity can be improved.

Further, in the embodiment, the safety determination unit 31 which determines the safety when the robot 50 enters the work region of the worker is provided. Due to such a configuration, the work region of the robot 50 can be widened by allowing the robot 50 to enter the work region of the worker when it is safe, and thus the productivity can be further improved while deterioration of safety is minimized.

Another Embodiment

The embodiment disclosed this time is an example in all aspects and is not a basis for a limited interpretation. Therefore, the technical scope of the present invention is not interpreted only by the above-described embodiment but is defined on the basis of the description of the claims. Also, the technical scope of the present invention includes meanings equivalent to claims and all changes within the scope.

For example, in the embodiment, the example in which the robot 50 is a robot arm has been described. However, the present invention is not limited thereto, and the control target may be a conveying device or the like which conveys components. That is, the control target is, for example, an industrial machine.

Further, in the embodiment, the example in which the operations of the whole body of the worker are detected by the plurality of detection devices 2 has been described. However, the present invention is not limited thereto, and only the operation of the local part (for example, an upper body) of the worker may be detected.

Further, in the embodiment, the example in which the worker information acquisition unit 21, the human body model calculation unit 22, the orientation calculation unit 24, the movable range calculation unit 25, the operation calculation unit 26, the work region calculation unit 27 for a worker, the robot information acquisition unit 28, the robot operation calculation unit 29, the work region calculation unit 30 for a robot 50, the safety determination unit 31, and the robot control unit 32 are realized by the CPU 11 executing the program 12a has been described. However, the present invention is not limited thereto, and each of the worker information acquisition unit, the human body model calculation unit, the orientation calculation unit, the movable range calculation unit, the operation calculation unit, the work region calculation unit for a worker, the robot information acquisition unit, the robot operation calculation unit, the work region calculation unit for a robot, the safety determination unit, and the robot control unit may be configured with hardware.

Further, in the embodiment, the example in which the position information and the posture information are calculated on the basis of the acceleration data and the angular velocity data. However, the present invention is not limited thereto, and the position information and the posture information may be calculated on the basis of speed data, angular acceleration data, pressure data, magnetic data, and so on. That is, the example in which the detection device 2 detects the acceleration data and the angular velocity data has been described. However, the present invention is not limited thereto, and the detection device may be configured to detect at least one of the acceleration data, the angular velocity data, the speed data, the angular acceleration data, the pressure data and the magnetic data.

Further, in the embodiment, the example in which the worker information acquisition unit 21 acquires the acceleration data and the angular velocity data and calculates the position information and the posture information using the acceleration data and the angular velocity data has been described. However, the present invention is not limited thereto, and the worker information acquisition unit acquires at least one of the acceleration data, the angular velocity data, the speed data, the angular acceleration data, the pressure data, and the magnetic data and may calculate at least one of the position information and the posture information using the acquired data.

Further, in the embodiment, the example in which the human body model calculation unit 22 calculates the human body model of the worker on the basis of the position information and the posture information has been described. However, the present invention is not limited thereto, and the human body model calculation unit may calculate the human body model of the worker on the basis of the position information or the posture information.

Further, in the embodiment, the example in which the human body model calculation unit 22 is provided in the control device 1 and the human body model can be input from the tool device 60 has been described. However, the present invention is not limited thereto, and when the human body model calculation unit 22 is provided, the human body model may not be input from the tool device 60, and when the human body model can be inputted from the tool device 60, the human body model calculation unit 22 may not be provided.

Further, in the embodiment, the example in which the human body model recording unit 23 is provided has been described. However, the present invention is not limited thereto, and when the human body model of the worker can be obtained from the outside, the human body model recording unit may not be provided.

Further, in the embodiment, the example in which the orientation calculation unit 24 calculates the orientation information of the worker on the basis of the position information and the posture information and the human body model of the worker has been described. However, the present invention is not limited thereto, and the orientation calculation unit may calculate the orientation information of the worker on the basis of the position information or the posture information and the human body model of the worker, and the orientation information of the worker may be calculated on the basis of at least one of the position information and the posture information regardless of the human body model. Further, when there is an orientation acquisition unit which acquires the orientation information of the worker, the orientation calculation unit may not be provided.

Further, in the embodiment, the example in which the orientation calculation unit 24 calculates the orientation information of the body of the worker and the orientation information of the head of the worker. However, the present invention is not limited thereto, and the orientation calculation unit may calculate only the orientation information of the head of the worker.

Further, in the embodiment, the example in which the movable range calculation unit 25 is provided has been described, but the present invention is not limited thereto, and the movable range calculation unit may not be provided. In this case, the work region calculation unit may estimate the work region on the basis of the orientation information, the operation information and the human body model of the worker.

Further, in the embodiment, the example in which the operation calculation unit 26 calculates the operation information from the position information, the posture information and the human body model has been described. However, the present invention is not limited thereto, and the operation calculation unit may calculate the operation information from the position information or the posture information and the human body model and may calculate the operation information on the basis of at least one of the position information and the posture information regardless of the human body model. Further, when the first operation acquisition unit which acquires the operation information of the worker is provided, the operation calculation unit may not be provided.

Further, in the embodiment, the work region calculation unit 27 may estimate a region having high operability in the work region. Specifically, the work region calculation unit 27 may perform a weighted evaluation for operability in the work region on the basis of the orientation information of the worker (the orientation information of the body and the head) calculated by the orientation calculation unit 24. Additionally, the work region calculation unit 27 may estimate that the region in which a weighted value (operability) is equal to or greater than a predetermined value is a region with high operability. In addition, the predetermined value is, for example, a preset value and is a boundary value in which it is determined that the operability is high. In a specific example of the weighted evaluation, since the worker is highly likely to perform work in a region in a direction in which the head faces, the weighted value of that region is increased, and the weighted value is decreased as it goes away from that region. In this case, the robot control unit 32 may operate the robot 50 outside the region with the high operability.

Further, in the embodiment, the example in which the robot operation calculation unit 29 and the work region calculation unit 30 are provided has been described. However, the present invention is not limited thereto, and when the operation information and the work region of the robot are recorded in advance in the ROM of the control device, the robot operation calculation unit and the work region calculation unit may not be provided. In this case, Steps S8 and S9 in the flowchart of FIG. 3 may be omitted.

Further, in the embodiment, the example in which the control program of the robot 50 is recorded in the ROM 12 of the control device 1 has been described. However, the present invention is not limited thereto, and the control program of the robot may not be recorded in the ROM of the control device. That is, the robot which is autonomously operated may be prohibited from entering the work region of the worker when it is not safe for the robot to enter. In this case, the operation information is calculated from a variety of information of the robot, and the work region of the robot is also calculated therefrom. Additionally, in the case in which the work region of the worker interferes with the work region of the robot, when it is determined from the operation information of the worker and the operation information of the robot that it is not safe, a stop instruction or the like may be output to the robot.

Further, in the embodiment, the example in which the robot control unit 32 stops the robot 50 when it is determined by the safety determination unit 31 that it is not safe has been described. However, the present invention is not limited thereto, and when it is determined by the safety determination unit that it is safe, the robot may be controlled to perform other operations outside the work region of the worker. Further, when it is determined by the safety determination unit that it is not safe, the robot may be allowed to operate inside the work region by setting the robot in a state capable of securing the safety. Furthermore, for example, the setting of the robot in the state capable of securing the safety is to lower an operation speed of the robot such that the impact force at the time of the collision becomes less than a predetermined value.

Further, in the embodiment, the example in which the safety determination unit 31 determines the safety on the basis of the operation information of the worker and the operation information of the robot 50 has been described. However, the present invention is not limited thereto, and the safety determination unit may determine the safety on the basis of the operation information of the worker or the operation information of the robot.

Further, in the embodiment, the example in which the safety determination unit 31 is provided has been described, but the present invention is not limited thereto, and a safety determination unit may not be provided. In this case, it is preferable to operate the robot outside the work region of the worker.

Further, in the embodiment, the example in which it is determined that the cooperative operation has started when the start button is operated has been described. However, the present invention is not limited thereto, and when the worker enters a predetermined section, it may be determined that the cooperative operation has started. Similarly, the example in which it is determined that the cooperative operation has been ended when the end button is operated has been described. However, the present invention is not limited thereto, and when the worker leaves the predetermined section, it may be determined that the cooperative operation has been ended.

Further, in the flowchart of the embodiment, the example in which the work region of the robot 50 is calculated after the work region of the worker is calculated has been described. However, the present invention is not limited thereto, and the work region of the worker and the work region of the robot may be calculated at the same time or the work region of the worker may be calculated after the work region of the robot is calculated. Similarly, the example in which the operation information of the robot 50 is calculated after the operation information of the worker is calculated has been described. However, the present invention is not limited thereto, and the operation information of the worker and the operation information of the robot may be calculated at the same time or the operation information of the worker may be computed after the operation information of the robot is calculated. That is, the flowchart of FIG. 3 is an example and is not limited to the procedure.

INDUSTRIAL APPLICABILITY

The present invention can be used for a work region estimation device, a control device, a control system, a work region estimation method, and a program.

The invention claimed is:

1. A control device comprising:
a work region estimation device which estimates a region in which a worker performs work; and
a control unit,
wherein the work region estimation device comprises:
a processor;
a memory, coupled to the processor,
wherein the processor is configured to function as:
a first operation acquisition unit configured to acquire operation information of the worker;
an orientation acquisition unit configured to acquire orientation information of the worker; and
a work region calculation unit configured to calculate a region in which a worker operation is forecast on the basis of the operation information, the orientation information and a human body model of the worker,
wherein the control unit is configured to control a control target based on the region in which the worker operation is forecast,
wherein the orientation information includes the orientation information of the body of the worker and the orientation information of the head of the worker,
wherein the work region calculation unit is further configured to perform a weighted evaluation for operability in the region in which the worker operation is forecast on the basis of the orientation information of the body and the orientation information of the head,
wherein the control unit is further configured to operate the control target outside a region in which the operability is equal to or greater than a predetermined value.

2. The control device according to claim 1, the processor being further configured to function as:
a movable range calculation unit configured to calculate a movable range of the worker on the basis of the orientation information and the human body model,
wherein the work region calculation unit calculates the region in which the worker operation is forecast on the basis of the operation information and the movable range.

3. The control device according to claim 1, the processor being further configured to function as:
a state acquisition unit configured to acquire at least one of position information or posture information of the worker.

4. The control device according to claim 3, wherein the state acquisition unit is configured to acquire at least one of acceleration data, angular velocity data, speed data, angular acceleration data, pressure data, and magnetic data, and calculate at least one of the position information and the posture information using the acquired data.

5. The control device according to claim 3, wherein the orientation acquisition unit is configured to calculate the orientation information on the basis of the human body model and at least one of the position information and the posture information.

6. The control device according to claim 3, wherein the first operation acquisition unit is configured to calculate the operation information on the basis of the human body model and at least one of the position information and the posture information.

7. The control device according to claim 3, the processor being further configured to function as:
a human body model calculation unit configured to calculate the human body model from at least one of the position information and the posture information.

8. The control device according to claim 1, the processor being further configured to function as:
a human body model recording unit configured to record the human body model.

9. The control device according to claim 1, wherein the control unit is configured to operate the control target outside the region in which the worker operation is forecast.

10. The control device according to claim 1, comprising a safety determination unit configured to determinate safety when the control target enters the region in which the worker operation is forecast.

11. The control device according to claim 10, wherein the control unit is configured to be capable of operating the control target inside the region in which the worker operation is forecast when it is determined by the safety determination unit that it is safe.

12. The control device according to claim 10, wherein the control unit is configured to set the control target to be in a state in which safety is ensured when it is determined by the safety determination unit that it is not safe, so as to allow an operation of the control target inside the region in which the worker operation is forecast.

13. The control device according to claim 10, wherein the safety determination unit is configured to determine the safety on the basis of the operation information.

14. The control device according to claim 10, comprising a second operation acquisition unit configured to acquire operation information of the control target,
wherein the safety determination unit is configured to determine the safety on the basis of the operation information of the control target.

15. A control system comprising:
a control device; and
a detection device worn by a worker,
wherein the control device comprises:
a work region estimation device which estimates a region in which the worker performs work; and
a control unit,
wherein the work region estimation device comprises:
a processor;
a memory, coupled to the processor,
wherein the processor is configured to function as:
a first operation acquisition unit configured to acquire operation information of the worker;
an orientation acquisition unit configured to acquire orientation information of the worker; and
a work region calculation unit configured to calculate a region in which a worker operation is forecast on the basis of the operation information, the orientation information and a human body model of the worker,
wherein the control unit is configured to control a control target based on the region in which the worker operation is forecast,
wherein the orientation information includes the orientation information of the body of the worker and the orientation information of the head of the worker,
wherein the work region calculation unit is further configured to perform a weighted evaluation for operability in the region in which the worker operation is forecast on the basis of the orientation information of the body and the orientation information of the head,
wherein the control unit is further configured to operate the control target outside a region in which the operability is equal to or greater than a predetermined value.

16. The control system according to claim 15, wherein the detection device is configured to detect at least one of acceleration data, angular velocity data, speed data, angular acceleration data, pressure data, and magnetic data,
the work region estimation device includes a state acquisition unit configured to acquire at least one of position information and posture information of the worker, and
the state acquisition unit is configured to acquire a detection result of the detection device, and calculate at least one of the position information and the posture information using the acquired detection result.

17. A control device comprising:
a work region estimation device which estimates a region in which a worker performs work; and
a control unit,
wherein the work region estimation device comprises:
a first operation acquisition circuit configured to acquire operation information of the worker;
an orientation acquisition circuit configured to acquire orientation information of the worker; and
a work region calculation circuit configured to calculate a region in which a worker operation is forecast on the basis of the operation information, the orientation information and a human body model of the worker,
wherein the control unit is configured to control a control target based on the region in which the worker operation is forecast,
wherein the orientation information includes the orientation information of the body of the worker and the orientation information of the head of the worker,
wherein the work region calculation unit is further configured to perform a weighted evaluation for operability in the region in which the worker operation is forecast on the basis of the orientation information of the body and the orientation information of the head,
wherein the control unit is further configured to operate the control target outside a region in which the operability is equal to or greater than a predetermined value.

* * * * *